(12) United States Patent
Boeger et al.

(10) Patent No.: US 8,051,974 B2
(45) Date of Patent: Nov. 8, 2011

(54) LINEAR VIBRATORY CONVEYOR

(75) Inventors: Christian Boeger, Regensburg (DE); Franz Edbauer, Teublitz (DE)

(73) Assignee: Feintool Intellectual Property AG, Lyss (CH)

( * ) Notice: Subject to any disclaimer, the term of this patent is extended or adjusted under 35 U.S.C. 154(b) by 35 days.

(21) Appl. No.: 12/217,453

(22) Filed: Jul. 3, 2008

(65) Prior Publication Data
US 2009/0032375 A1 Feb. 5, 2009

(30) Foreign Application Priority Data

Aug. 1, 2007 (DE) .................. 10 2007 036 491

(51) Int. Cl.
*B65G 27/16* (2006.01)
(52) U.S. Cl. ........ 198/766; 198/760; 198/761; 198/764; 198/770; 198/771
(58) Field of Classification Search ............... 198/752.1, 198/753, 758, 759, 760, 761, 764, 766, 770, 198/771
See application file for complete search history.

(56) References Cited

U.S. PATENT DOCUMENTS

| | | | |
|---|---|---|---|
| 3,786,912 A | 1/1974 | Taylor | |
| 4,340,469 A * | 7/1982 | Archer | 209/315 |
| 4,341,126 A * | 7/1982 | Thomas | 74/61 |
| 4,378,064 A * | 3/1983 | Brown | 198/769 |
| 4,979,608 A * | 12/1990 | Mikata et al. | 198/566 |
| 5,314,056 A * | 5/1994 | Davis et al. | 198/396 |
| 5,664,664 A * | 9/1997 | Gaines | 198/769 |
| 5,850,906 A * | 12/1998 | Dean | 198/750.8 |
| 6,047,811 A * | 4/2000 | Zittel et al. | 198/763 |
| 6,318,542 B1* | 11/2001 | Ikeda et al. | 198/769 |
| 6,357,579 B1* | 3/2002 | Patterson et al. | 198/766 |
| 6,415,913 B2 | 7/2002 | Sleppy et al. | |
| 6,991,091 B2* | 1/2006 | Thomson et al. | 198/752.1 |
| 7,104,394 B2* | 9/2006 | Baird et al. | 198/769 |
| 7,387,198 B2* | 6/2008 | Thomson | 198/770 |

FOREIGN PATENT DOCUMENTS

| | | |
|---|---|---|
| CA | 2204682 | 7/2004 |
| DE | 2 139018 | 2/1972 |
| DE | 196 09 039 | 9/1997 |
| DE | 10 2005 051 239 | 12/2006 |
| JP | 3-051210 | 3/1991 |
| JP | 9-142630 | 6/1997 |

* cited by examiner

*Primary Examiner* — Douglas A Hess
(74) *Attorney, Agent, or Firm* — Jordan and Hamburg LLP

(57) ABSTRACT

Linear vibratory conveyor including a utility weight and a counterweight that can be vibratingly moved in opposing directions via a drive unit, the utility weight and the counterweight being connected via a non-rigid connector that represents or includes a vibration amplifying means for the vibration produced by the drive unit.

19 Claims, 3 Drawing Sheets

LINEAR VIBRATORY CONVEYOR

BACKGROUND OF THE INVENTION

The invention relates to a linear vibratory conveyor including a utility weight and a counterweight that can be vibratingly moved in opposing directions via a drive unit, the drive unit preferably being arranged in a receiving chamber beneath the utility weight.

Such linear vibratory conveyors transport small and very small components for instance to an assembling machine, where the components are either to be processed or installed. The principle on which such a linear vibratory conveyor works is based on a counterweight and a utility weight, part of which is a transport rail along which the components are moved, being caused to vibrate in opposition to one another so that the components move on the transport rail by microjumps. The utility weight and counterweight are each vibratingly connected via corresponding spring elements, primarily leaf springs or leaf spring packets, to the base plate, via which the linear vibratory conveyor is connected to a third article, for instance an assembly table. Normally an electromagnet is used for the drive unit, the magnet core generally being connected by the coil surrounding it to the counterweight and the magnet armature to the utility weight. When alternating voltage is applied to the coil, an alternating magnetic field is created as a function of the voltage frequency and it acts on the armature, which moves freely relative to the magnet core and is thus not connected thereto, the opposing vibrational movement of the two weights ultimately resulting.

The functioning principle is such that when the electromagnet is excited, that is, when the coil is supplied with current, the armature is drawn to or toward the magnet core via the magnetic field that builds up. The utility weight and the counterweight are moved somewhat towards one another, and the spring elements are correspondingly bent. Thus the weights actively move. When the electromagnets cease to be excited, the return is effected solely via the relaxing spring elements. The travel of the electromagnets is limited, however, so that a relatively narrow vibrating amplitude results, which then leads to the mean quantity conveyed being low.

SUMMARY OF THE INVENTION

The underlying object of the invention is thus to provide a linear vibratory conveyor in which an adequate vibrating amplitude is assured regardless of the type of drive unit used.

For solving this problem, it is inventively provided in a linear vibratory conveyor of the aforesaid type that the utility weight and the counterweight are connected via a non-rigid connector that represents or includes a vibration amplifying means for the vibration produced by the drive unit.

In the inventive linear vibratory conveyor, the utility weight and the counterweight are movably connected to one another, different from the prior art, where both are freely moveable relative to one another. In accordance with the invention, the non-rigid, movable mechanical weight connector forms a vibration amplifying means or contains the means so that it is possible to actively amplify the vibration or movement produced by the drive unit. Thus adequate vibrating amplitudes can be attained even if the drive unit itself has only relatively short vibrating travel. This also permits the use of drive units other than electromagnets, e.g. a piezoelectric drive in which the integrated piezoactuator has only very minor travel, or a hydraulic or pneumatic drive including a reversibly expandable bellows or an electric drive motor with an eccentric drive, which will be explored further in the following. The two weights here are movably coupled via a connector that is entirely mechanical but flexible or movable and path-lengthening, which is different from when an electromagnet is used, where as described the armature is freely movable relative to the magnet core from which it is spaced apart. In contrast, in the inventive conveyor any movement component of the drive unit, whether in the one direction or the other, is transmitted via the drive unit via a vibration amplifying means to the two weights, the movement of the drive unit arranged on the utility weight or counterweight that causes it to produce vibration on the vibration-amplifying mechanical weight connector being increased by this vibration amplification so that, relative to the vibrating amplitude obtained, the drive travel increases significantly and the vibrating amplitude increases significantly, depending on the transmission ratio of the vibration amplifying means, that is the ratio of the travel generated by the drive unit to the resulting vibrating travel.

According to a first inventive embodiment, the drive unit can be a piezoelectric drive. Such a piezoelectric drive has an actuator made of a piezoelectric material. A high-frequency alternating voltage is applied thereto. The geometry of the piezoelectric actuator changes when voltage is applied to it. Normally with such materials it is possible to attain defined lengthening in the one direction and shortening in a direction perpendicular thereto via a first, positive voltage flank and a corresponding movement in the opposite directions via the second, negative voltage flank of the alternating voltage. Since the shape of such materials can be changed at a very high frequency, with such an actuator it is advantageously possible to produce very high-frequency vibrations. The actuator is inserted into the mechanical connector such that it acts on both weights. During actuation-induced lengthening, the two weights are moved somewhat apart from one another, i.e. the spring elements are bent away from one another and a restoring force builds up. This restoring force works continuously against the piezoelectric actuator. If the other voltage flank is applied to the piezoelectric actuator, the latter becomes shorter, so that the spring elements can relax, but only enough that the restoring movement is possible as a result of the continuously changing geometry of the actuator.

An alternative drive unit can be embodied in the form of a pneumatically or hydraulically reversibly expandable bellows. Such a bellows is inserted between utility weight and counterweight and can be activated using a pneumatic or hydraulic working means. It also forms a mechanical connector element. The bellows can be varied between two maximum conditions, specifically a maximum filled condition and a emptied condition that can be defined by the actuation, a change in geometry being associated with the change. If the bellows grows larger, for instance is filled, it expands, preferably in a defined manner depending on the embodiment, in a direction perpendicular to the bending axis so that the two weights move away from one another and thus the respective spring elements bend away from one another. In this case, as well, the restoring force builds up, i.e. in this case as well the spring elements work continuously against the expanding bellows. If the latter is emptied, the spring elements can relax, the relaxation movement always being defined and limited by the bellows, since the spring elements always work against the bellows, even during relaxation. Such a bellows can also be reversibly filled and emptied with sufficient speed via one or a plurality of upstream valve elements so that in this case as well it is possible to attain sufficiently high vibration frequencies.

A third alternative embodiment of a drive unit is an eccentric or at least an eccentrically arranged part of a driving motor. Such an eccentric drive motor has a drive shaft on which for instance one or two cams are arranged at mutually opposing positions, that is offset by 180 degrees as parts eccentric or offset to the drive axis. It is also possible to provide more than two cams, which are then preferably distributed equidistant from one another. Again, the spring elements work against the drive shaft and thus against the cams. In the one maximum position, in which the cams are vertical and do not act on the utility weight and counterweight, the spring elements are in the relaxed position, and the two weights are pressed via the spring elements against the drive shaft. If the latter now rotates, one of the two cams runs onto the vibration amplifying means and moves the weights apart from one another, the spring elements also being bent apart from one another. Maximum spreading is attained when the cams are horizontal. The spring elements always work against the driving cams. Given a further rotation by the shaft, the cams run back down from the vibration amplifying means. The weights can move back towards one another via a restoring movement that is always defined by the position of the shaft and cams, and the spring elements again relax in a defined manner.

Each drive unit is activated via a suitable control device that is coupled to the drive unit, where necessary via an interposed valve block in the case of a pneumatic or hydraulic drive.

Different types of usable vibration amplifying means are possible. It can be a mechanical amplifying means in which thus the path is transmitted solely through the mechanical embodiment of the amplifying means. However, it is also conceivable to use an amplifying means that works hydraulically or pneumatically.

A mechanical vibration amplifying means can be created in the form of at least one spring element that connects the utility weight and the counterweight. It is possible to increase the travel of the drive unit via this spring element, thereby amplifying the vibration. This is particularly useful in the case of a piezoelectric drive, since the change in length of the piezoelement is relatively small and this longitudinal movement grows larger via the coupled spring element and thus the travel can be increased. This spring element can also advantageously be used for a hydraulic or pneumatic bellows or for an eccentric or cam drive. Because it is then possible to embody these drive units somewhat smaller so that the travel of the bellows can be reduced or e.g. the cam travel can be configured shorter, as well.

The drive unit usefully works directly against the spring element. I.e., the vibration of the drive unit is added directly to the spring element, where it is correspondingly amplified. This leads to efficient vibration propagation. The spring element itself is preferably a bent leaf spring that is particularly usefully in a U-shape. This U-shape, with two lateral legs that are vertical when installed, and with one transverse leg that connects these two lateral legs, is particularly useful in terms of the linear movement of the weights, that is, for the linear travel.

Another advantageous embodiment of the invention provides that the stiffness of the spring element, in particular of the leaf spring, varies across its length. This makes it possible to be able to adjust a wide vibrating amplitude in certain spring areas, i.e. in this area the spring vibrates somewhat farther, which is useful for the amplification. In accordance with a first embodiment of the invention, the bent leaf springs can be narrower in the area of the spring leg that faces away from the drive unit. I.e., the geometry of the spring changes on the spring leg that is not directly coupled to the drive unit or for instance is not indirectly coupled to the drive unit via an intermediate unit. For instance, the width of the spring leg decreases in this area to half the width of the other spring leg. However, it would also be conceivable to provide corresponding passages or the like on the spring leg. Alternative to the integral embodiment of the bent leaf spring having varying leg widths, the spring leg facing away from the drive unit can also be embodied in two parts and can comprise a first leg segment and a second leg segment that is thinner and that is joined thereto. In this embodiment of the invention, then, the leaf spring has two parts. A first spring part, which is itself already essentially U-shaped, has a first thickness, for instance approx. 1.5 mm, while a second spring part, which is joined to the one free spring leg, that is, to the spring leg that is not directly or indirectly activated by the drive unit, has a second thickness of for instance 0.8 mm. These two spring or leg parts are joined to one another via a suitable connection piece. Via such a change in the vibration properties of the spring that results from different material thicknesses it is also possible to attain a sharp increase in vibrating amplitude, which can also be adjusted as needed by appropriately selecting the leaf spring parts used (different thicknesses, widths, materials).

Instead of a spring element, a mechanical vibration amplifying means can also be created in the form of a hinge, the one leg of which is pivotably connected to the utility weight and the other leg of which is pivotably connected to the counterweight. A considerable transmission ratio can be attained via the leg length and the angle between the legs that the latter assume in the position most proximate to one another. The drive unit, that is e.g. the piezoactuator, works against one of the two legs of the hinge.

A hydraulically or pneumatically working amplifying means can be created in the form of two pistons inserted one after the other, the diameter of the piston coupled to the utility weight being smaller than that of the piston coupled to the counterweight, or vice versa. If the ratio of the sectional surface area of the pistons is e.g. 1:10, the small piston is displaced e.g. 10 mm when the large piston is moved 1 mm.

In addition, the larger piston can be created by means of a membrane that limits a fluid reservoir and that can be moved directly or indirectly via the drive unit. The membrane is moved via the drive unit, this acting on the fluid, e.g. an oil. The fluid reservoir has a segment with a smaller diameter into which the fluid is pressed, the path traveled there being much longer than the membrane is moved. Provided in this area is the second piston, which is moved via the moving column of fluid and thus moves the other weight. If the membrane is unloaded, the second piston can press the column of fluid back, creating vibration, the vibrating amplitude being significantly increased via the transmission ratio, which is semi-hydraulic.

Additional advantages, features, and details of the invention result from the exemplary embodiments described in the following and using the drawings.

DESCRIPTION OF THE PREFERRED EMBODIMENTS

Figure 1:
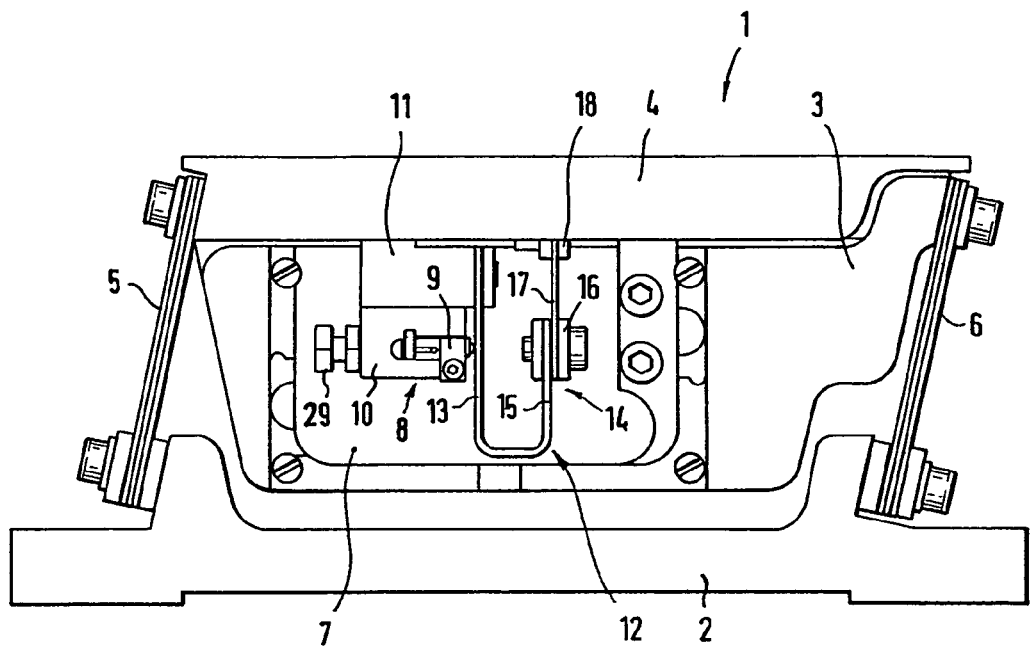
FIG. 1 depicts the principle of a first embodiment of an inventive linear vibratory conveyor having a piezoelectric drive.

FIG. 1 depicts an inventive linear vibratory conveyor 1, including a base plate 2, a counterweight 3, and a utility weight 4, only a portion of which is depicted. The transport rail which is to be arranged on the utility weight 4 and along which the components to be moved are transported with the linear vibratory conveyor 1 is not shown. At their ends, both the counterweight 3 and the utility weight 4 are connected to the base plate 2 via spring elements 5, 6, via which spring elements 5, 6 the counterweight 3 and the utility weight 4 can vibrate relative to one another. The spring elements 5, 6, which are leaf spring packets and which connect each of the weights 3, 4 to the base plate 2, are arranged offset cross-wise to one another as seen in the longitudinal direction of the linear vibratory conveyor 1. I.e., with respect to the depiction in FIG. 1, two spring elements 5, 6 are arranged one after the other on each side, and the one vibratingly connects the counterweight 3 to the base plate 2 and the other vibratingly connects the utility weight 4 to the base plate 2. The spring element 5 that connects the utility weight 4 to the base plate 2 can be seen in FIG. 1, while the spring element 5 disposed on the other side is arranged behind the visible spring element 6, which bears the counterweight 3 on this side. The spring element 6 that bears the counterweight 3 on the other side is not visible here—it is disposed behind the depicted spring element 5 bearing the utility weight 3. Corresponding members to which the spring elements 5 are attached are provided on the weights 3, 4.

Milled into the counterweight 3 is a pocket 7 in which is arranged the drive device 8, which in the exemplary embodiment depicted in FIG. 1 is a piezoelectric drive. The piezoelectric drive 8 includes a piezoelectric actuator 9 that is arranged in a suitable actuator housing 10 that is connected to the utility weight 4 via a fastening block 11. Moreover, arranged on the connecting block 11 is a vibration amplifying element in the form of a spring element 12, embodied here as a bent U-shaped leaf spring and having the one spring leg 13. The piezoelectric actuator 9 acts directly on the spring leg 13 when the length of the former changes in a defined manner, controlled via a high-frequency activating voltage.

The spring element 12 has a second spring leg 14 that is in two parts here. It includes a first leg segment 15 as part of the integral U-shaped leaf spring that has a first thickness. Connected to the latter via a fixed connector 16 is a second leg segment 17 that is not as thick and thus has a different spring behavior. Because it is not as thick, it experiences greater displacement given an equal force applied to it. In this manner it is possible to attain a significant increase or amplification in the oscillating amplitude that can be attained via the piezoelectric drive 9. The leg segment 17 is arranged in a suitable fixing device 18, which is itself connected to the counterweight 3 or is part thereof.

It can be seen here that there is a continuous mechanical but flexible moving connection between utility weight 4 and counterweight 3. This mechanical link is largely created by the U-shaped spring element 12, the piezoelectric drive 8 being inserted into this mechanical link and acting directly on the spring element 12. The spring element 12 significantly amplifies the movement of the piezoelectric drive or its realizable longitudinal path, compared to directly coupling the piezo-drive, that is, when the drive unit is installed between the utility weight and the counterweight and acts directly on the two weights.

As described, the piezoelectric drive 8 is activated with a high-frequency control voltage. What this leads to is that the piezoelectric actuator 9 changes its length in a defined manner as a function of voltage. When the one control voltage half-cycle is applied, the piezoelectric actuator 9 lengthens in its direction of action, and it shortens when the other half-cycle is applied. What this leads to is that, with regard to the depiction in FIG. 1, when the actuator lengthens the spring element 12 is continuously pressed to the right and is thus pre-stressed. Thus, the piezoelectric actuator works directly against the spring element 12. The spring elements 5, 6 are pressed apart from one another and they bend about their respective bending axes. When the actuator shortens, the spring element 12 and the spring elements 5, 6 relax again; thus they work de facto against the actuator itself, so the spring element moves back to the left and the spring elements 5, 6 bend back again until the actuator lengthens again due to voltage being applied. This results in high-frequency vibration of the spring element, which is transmitted amplified to the counterweight 3 with an amplified vibrating amplitude via the second leg segment 17, which as described vibrates farther or more strongly because it is not as thick. Thus the vibration of the utility weight 4 is amplified relative to the counterweight 3, this vibration being created by means of a continuous mechanical connector and being amplified via the interposed spring element. As a result of the direct movement coupling, each vibration of the utility weight 4 and counterweight 3 is synchronous and counterphasic. Because since the spring element 12 always works against the actuator, regardless of whether the latter is lengthening or shortening, the spring elements 5, 6 also necessarily work against the actuator. When the actuator lengthens, the spring elements 5, 6 are moved apart from one another, that is, they bend somewhat apart from one another, and when the actuator shortens they relax again and bend toward one another into the basic position depicted in FIG. 1 with the shortened actuator. The restoring movement is defined by the actuator or the actuator geometry; the two weights cannot vibrate entirely freely because they always work against the actuator via the spring element 12.

As FIG. 1 furthermore depicts, the piezoelectric drive 8 has an adjusting element 29 via which it is possible to adjust the position of the piezoelectric actuator 9 relative to the U-shaped spring element 12. The piezoactuator's position relative to the spring element 12 can be optimized using it, and it can also be used to adjust any pre-stress in the spring element 12.

Figure 2:
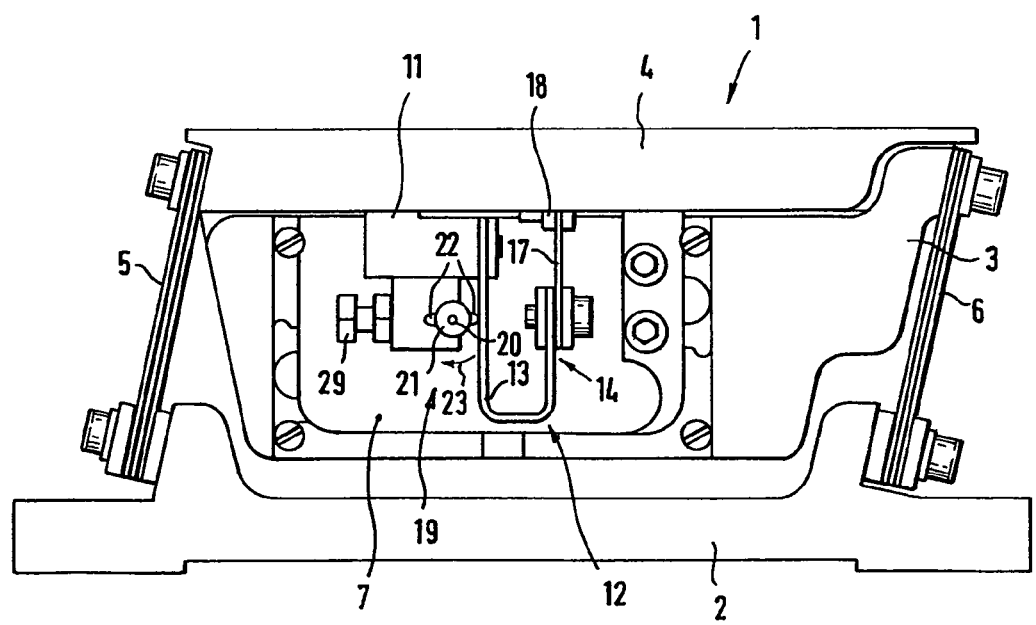
FIG. 2 depicts the principle of a second embodiment of an inventive linear vibratory conveyor having an eccentric drive.

FIG. 2 depicts another inventive embodiment of a linear vibratory conveyor. The structure of the linear vibratory conveyor 1 depicted there is the same as that in FIG. 1, that is, it is also provided a base plate 2 via which the linear vibratory conveyor 1 is securely bolted to a machine frame or the like, and a counterweight 3 and a utility weight 4 are also present. Likewise, these are both arranged on the base plate 2 vibratingly movable relative thereto and in opposition to one another via spring elements 5, 6.

The drive unit provided here is an electrical drive motor 19 with eccentrically arranged cams. The motor 19 has a drive shaft 20 on which is arranged an eccentric component 21 having two projecting cams 22. The drive motor 19 is itself arranged on a connecting block 11 that is fastened to the utility weight 4. Furthermore provided is a vibration amplifying element in the form of a U-shaped spring element 12 that corresponds to that in FIG. 1. I.e., its spring element leg 13 is arranged on the connecting block 11 and thus on the utility weight 4, while the second spring element leg 14, which is embodied in two parts, here, as well, is connected to the counterweight 3 via a connecting block 18.

The embodiment is now such that the drive motor 20, which can also be adjusted, via an adjusting element 29, in the longitudinal direction in terms of its relative position to the spring element 12, works with the two cams 22 against the spring element 12 (more than two cams are also conceivable). When the drive shaft 20 rotates, depicted by the arrow 23, the cams 22 rotate past the spring leg 13 as a function of the rotational frequency, run up against the latter, and displace it to the right. As a result, the weights 3, 4 are moved apart from one another, the spring element 12 is moved to the right and transmits its displacement, amplified via the thinner spring leg segment 17, to the counterweight 3, and a corresponding movement is transmitted to the utility weight 4. The spring elements 5, 6 are moved away from one another. If the output drive 20 continues to rotate, the cam 22 that has run up onto the spring leg 13 runs back down therefrom, the spring elements 5, 6 that work against the drive motor 19 here as well can relax, and there is a restoring movement—the weights 3, 4 move back toward one another. In the next cycle the second cam 22 runs up onto the spring element 12 and the cycle begins again.

In this case as well, there is a direct mechanical but flexible coupling between utility weight and counterweight 3, 4 via the spring element 12 that amplifies the movement or vibration initiated by the drive, the eccentric drive and the motor 19 being inserted into this mechanical connector. In this case as well, the spring elements 5, 6 work at all times against the drive motor 19, that is, the vibratory movement is defined by the current rotational position of the drive motor 19 or cams 20. The spring element 12 also significantly amplifies the vibration, compared to the vibrating amplitude that could be attained by coupling the drive arranged on the utility weight directly to the counterweight.

Figure 3:
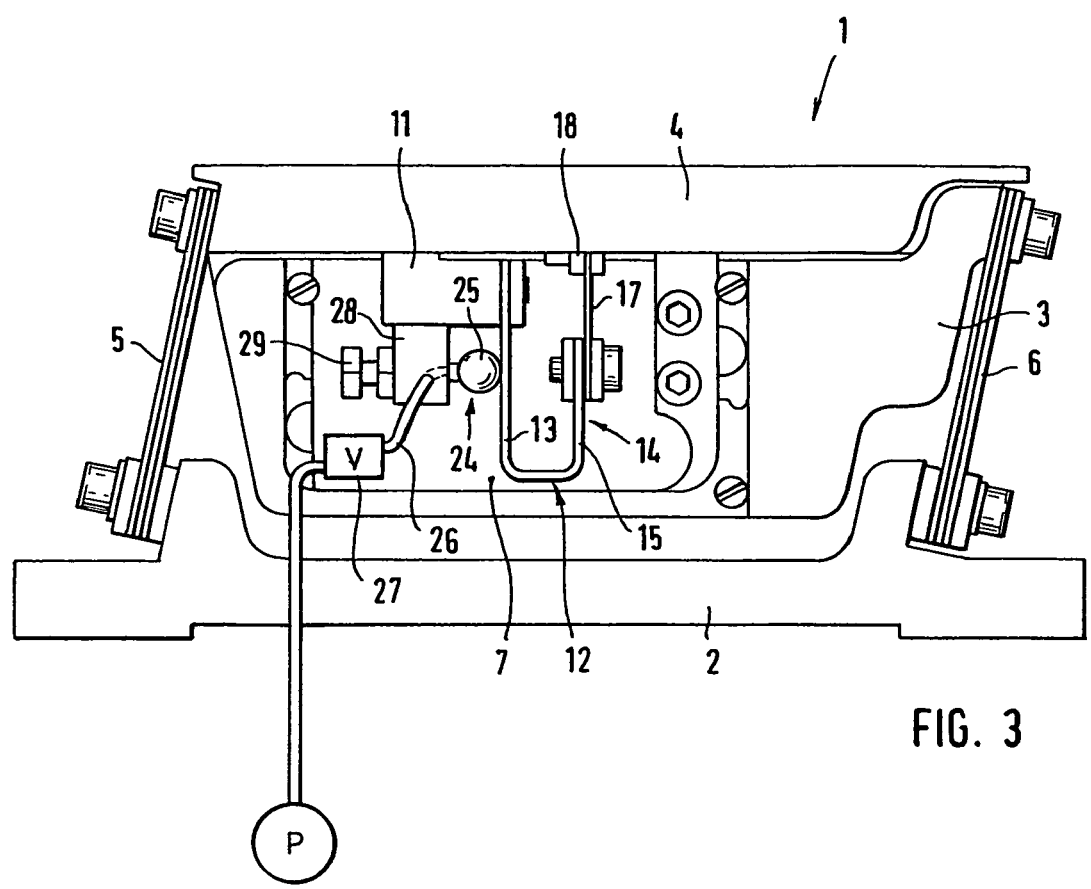
FIG. 3 depicts the principle of a third embodiment of an inventive linear vibratory conveyor having a pneumatically or hydraulic reversibly expandable bellows.

Furthermore, FIG. 3 depicts another embodiment of an inventive linear vibratory conveyor, the structure of which is the same as that for the embodiments described in the foregoing, and in this case as well a base plate 2, counterweight 3, and utility weight 4 are provided that are borne via corresponding spring elements 5, 6.

Provided here for the drive unit 24 is a reversibly expandable bellows 25, e.g. made of plastic (e.g. PTFE), that can be adjusted hydraulically or pneumatically between a maximum expanded position and an emptied form, in which it is somewhat smaller. To this end, a suitable hydraulic or pneumatic line 26 is provided that is upstream of a corresponding valve component 27, which itself communicates with a pump P. The expandable bellows is arranged on a suitable housing component 28, which itself can be adjusted relative to the U-shaped spring element 12 via an adjusting element 29. The housing component 28 is itself arranged on the connecting block 11 and is thus securely connected to the utility weight 4, on which connecting block 11 the leg 13 of the U-shaped spring element 12 is also arranged embodied in two parts here as well, and, with the second leg 14, or its second leg segment 17, is arranged on the connecting block 18 of the counterweight 3.

As described, the expandable bellows 25 can also be expanded and emptied at a high frequency, this being associated with a change in geometry. To this end, the valve element 27 for instance is activated appropriately via a suitable control line via a control (not shown in greater detail). In any case, here as well the bellows 25 works directly against the spring element 12 so that the latter is moved to the right when the bellows 25 is expanded, the spring element vibration is amplified and transmitted to the counterweight 3, both weights 3, 4 move apart from one another, and the spring elements 5, 6 are bent away from one another. If the bellows 25 is emptied, the spring elements 5, 6 can relax, the weights are moved back toward one another, and the spring element 12 moves to the left. In this case, as well, the spring elements 5, 6 or the spring element 12 work directly against the bellows 25. Its position or geometry largely determines the path for the spring elements 5, 6, and thus the weights 3, 4, moving apart and back towards one another. Thus this is also a continuous flexible mechanical connector, the bellows being a part thereof.

Figure 4:
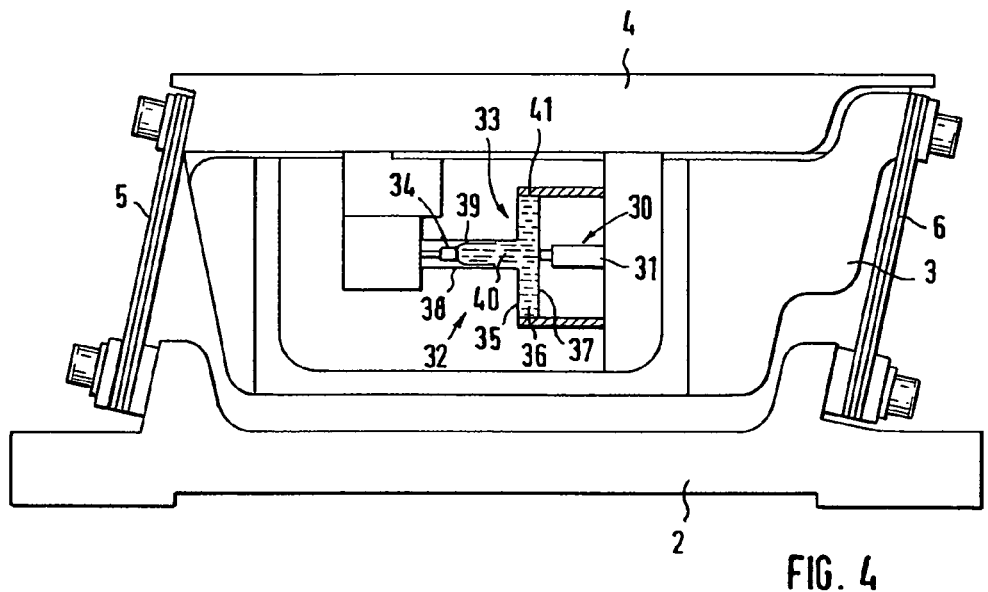
FIG. 4 depicts the principle of a fourth embodiment of an inventive linear vibratory conveyor having a piezoelectric drive and a vibration amplifying means in the form of a hydraulic piston transmission.

FIG. 4 depicts an inventive linear vibratory conveyor, the structure of which is the same as that of the embodiment described in the foregoing; in this case, as well, a base plate 2, counterweight 3, and utility weight 4 are provided that are borne vibratingly movable via corresponding spring elements 5, 6. As described with respect to FIG. 1, in this case, as well a piezoelectric drive unit 31 is provided for the drive unit 30 and in the embodiment depicted it is arranged on the counterweight 3. Provided in this case for the vibration amplifying means is a hydraulic piston arrangement 32, including a first hydraulic piston 33 that is associated with the counterweight 3 and that a second piston 34 that is connected to or acts on the utility weight 4. The hydraulic piston 33 includes a fluid reservoir 35 that is filled with a fluid, e.g. a hydraulic fluid 36. The piezoelectric drive 31 acts on a flexible membrane 37 that closes the hydraulic piston 33 to the side of the counterweight 3. The preferably circular diameter of the membrane 37 or fluid reservoir 35 in this area is significantly larger than in a narrowing segment 38, in which the fluid reservoir is limited by a second membrane 39, which is also flexible. This column of fluid 40 that is arranged in this constricted segment 38 presses on the second piston 34, which itself is coupled to the utility weight 4. If the membrane 37 is now pressed to the left when the piezoelectric actuator 31 lengthens, as in the depicted example, the volume of the wide area 41 of the fluid reservoir is reduced, fluid 36 is pressed into the narrowed segment 38, and the column of fluid 40 lengthens so that the second piston 34 is moved to the left. This presses the two weights 3, 4 away from one another and also moves the spring elements 5, 6 away from one another. When the piezoelectric actuator 31 becomes shorter again the spring elements 5, 6 can relax, the second piston 34 presses the column of liquid 40 back again, and the membrane 37 in the depicted example is moved to the right.

It is possible to amplify the vibrations considerably using this hydraulic piston arrangement 32. Because the path by which the column of fluid 40 is lengthened when the piezoelectric actuator 31 lengthens is significantly longer, due to the clearly different diameter ratios in the two segments 38 and 41 of the fluid reservoir 35, compared to the actual lengthening path of the piezoelectric actuator. In this case, as well, it is possible to increase the vibrating amplitude considerably.

Figure 5:
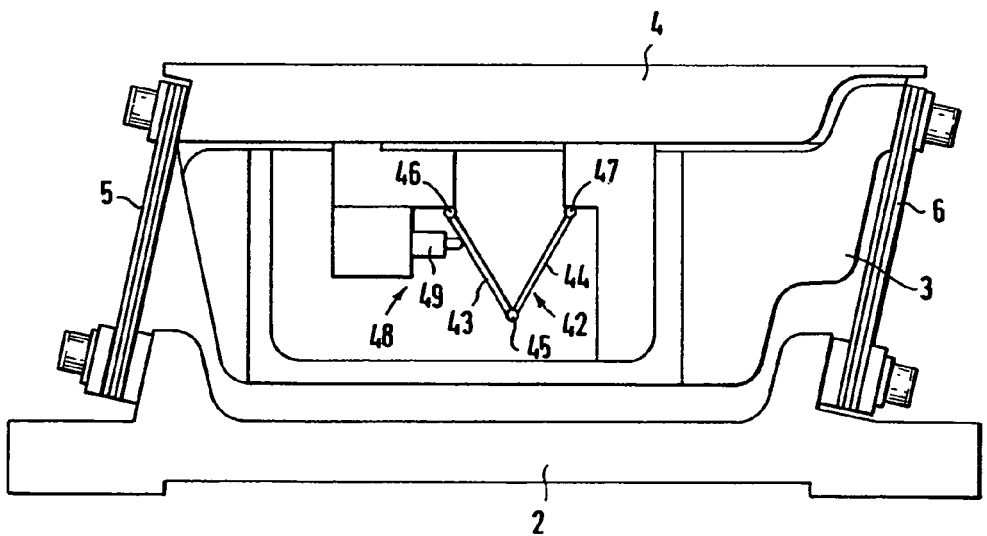
FIG. 5 depicts the principle of a fifth embodiment of an inventive linear conveyor having a piezoelectric drive and a vibration amplifying means in the form of a hinge.

Finally, FIG. 5 depicts a fifth embodiment of an inventive linear vibratory conveyor, the structure of which is also the same as in the embodiments described in the foregoing. In this case, used for the vibration amplifying means is a hinge 42 comprising two legs 43, 44 that are pivotably connected to one another via a first joint 45. The two ends of the legs 43, 44 are connected via corresponding pivot joints 46, 47 to the utility weight 4 and the counterweight 3, respectively. This pivot connection is configured such that the pivot movement of the legs 43, 44 is limited, that is, an angular position is defined, up to which position the angles can be pivoted toward one another, and a further pivot movement of the legs 43, 44 towards one another is prevented by the joints 46, 47. Thus a minimum takeout angle for the hinge 42 is defined via the joints 46, 47.

In this case, as well, provided for the drive unit 48 is a piezoelectric drive 49, which in the example depicted is arranged on the utility weight and acts directly on the leg 43 attached on the utility weight side. What this leads to is that the hinge is moved or pivoted to the right about the joint 46. Since in the starting position the joint 47 does not permit the leg 44 in accordance with FIG. 4 to pivot to the right, the counterweight 3 is forced to move to the right. Ultimately, pursuant to the principle of the lever, the path that the rotational axis for the joint 47 is moved to the right is significantly longer than the path that the rotational axis of the joint 45 is displaced to the right. The length of the resultant utility weight movement is consequently the result of the displacement of the hinge relative to the joint 46 and to the change in the takeout angle between the two legs 43, 44. The piezoelectric actuator 49 should engage as close a possible to the joint 46 so that despite the short actuator travel the joint 45 is moved as far as possible to the right and as a result the joint 47 and with it the utility weight 3 are moved even farther due to the hinge geometry.

When the piezoelectric actuator 49 becomes shorter again, the spring elements 5, 6 can relax, leading to the reversal of the mechanical pivoting movement, that is, the legs 43, 44 move back toward one another. The vibration can also be significantly amplified using this hinge arrangement due to the geometry of the hinge and its arrangement.

What is claimed is:

1. A linear vibratory conveyor, comprising:
   a base plate;
   a vibration producing drive;
   a utility weight and a counterweight independently connected to said base plate via spring elements such that the utility weight and counterweight are vibratingly movable in opposing directions by operation of the drive unit; and
   a non-rigid connector that represents or includes a vibration amplifying mechanism for amplifying the vibration produced by the drive unit, said non-rigid connecter interconnecting the utility weight and the counterweight.

2. A linear vibratory conveyor in accordance with claim 1, wherein the vibration amplifying mechanism is a mechanical amplifying mechanism or a hydraulic or pneumatic amplifying mechanism.

3. A linear vibratory conveyor in accordance with claim 2, wherein a mechanical vibration amplifying mechanism is created in the form of at least one spring element connecting the utility weight and the counterweight.

4. A linear vibratory conveyor in accordance with claim 3, wherein the drive unit works directly against the spring element.

5. A linear vibratory conveyor in accordance with claim 3 wherein the spring element is a bent leaf spring.

6. A linear vibratory conveyor in accordance with claim 5, wherein the bent leaf spring is U-shaped.

7. A linear vibratory conveyor in accordance with claim 5, wherein the stiffness of the bent leaf spring varies across its length.

8. A linear vibratory conveyor in accordance with claim 7, wherein:
   the bent leaf spring includes spring legs, and
   said bent leaf spring is narrower in an area of a one of the spring legs that faces away from the drive unit.

9. A linear vibratory conveyor in accordance with claim 7, wherein:
   the bent leaf spring includes spring legs, and
   a one of the spring legs that faces away from the drive unit is in two parts and comprises a first leg segment and a second leg segment that is thinner than said first leg segment and that is joined thereto.

10. A linear vibratory conveyor in accordance with claim 2, wherein the mechanical vibration amplifying mechanism is created in the form of a hinge, one leg of which is pivotably connected to the utility weight and the other leg of which is pivotably connected to the counterweight.

11. A linear vibratory conveyor in accordance with claim 10, wherein the drive unit works directly against the leg that is part of the hinge and that is connected to the utility weight or to the counterweight.

12. A linear vibratory conveyor in accordance with claim 2, wherein the hydraulic or pneumatic vibration amplifying mechanism is created in the form of two pistons inserted one after the other, the diameter of the piston coupled to the utility weight being smaller than that of the piston coupled to the counterweight, or vice versa.

13. A linear vibratory conveyor in accordance with claim 12, wherein the larger piston is created by means of a membrane that limits a fluid reservoir and that can be moved via the drive unit.

14. A linear vibratory conveyor in accordance with claim 12, wherein the drive unit works directly against the piston coupled to the utility weight or counterweight.

15. A linear vibratory conveyor in accordance with claim 1, wherein the drive unit is a piezoelectric drive.

16. A linear vibratory conveyor in accordance with claim 1, wherein the drive unit is a pneumatically or hydraulically reversibly expandable bellows.

17. A linear vibratory conveyor in accordance with claim 1, wherein the drive unit is an electric drive motor with an eccentric drive.

18. A linear vibratory conveyor in accordance with claim 1, wherein said non-rigid connector comprises a mechanical, but flexible or moveable, path-lengthening connector.

19. A linear vibratory conveyor in accordance with claim 1, wherein said drive unit and said vibration amplifying mechanism are arranged within a milled out portion of the counterweight between said counterweight and said utility weight, so as not to be connected directly to the base plate.

* * * * *